Patented May 1, 1945

2,374,969

UNITED STATES PATENT OFFICE 2,374,969

ROSIN REACTION PRODUCT AND METHOD OF PREPARATION

Ludwig F. Audrieth, Dover, N. J., assignor to Hercules Powder Company, Wilmington, Del., a corporation of Delaware No Drawing. Application April 27, 1943,
Serial No. 484,762

9 Claims. (Cl. 260—100)

This invention relates to a new composition of matter and to a method for its production, and more particularly to a new rosin compound and to a method for its production.

In accordance with this invention acetone or diacetone alcohol or mesityl oxide, is treated with ammonia and a rosin acid at a temperature between about 0° C. and about 100° C., with the ammonia in molal excess of the rosin acid present, the excess being sufficient to insure an alkaline condition, until a crystalline precipitate of the diacetoneamine salt of the rosin acid or rosin acids present is formed. The crystalline precipitate is then recovered from the reaction mixture, for example, by filtration and drying. If desired, the crystalline product may be purified by redissolving and recrystallizing.

The product obtained is a white crystalline salt which has a melting point with decomposition between about 145° C. and about 165° C. depending upon the purity of the salt and also depending on the particular rosin acid utilized since rosin acids are almost universally mixtures of isomers. The exact melting point will depend on the particular mixture of rosin acids present. In the case of products predominantly salts of abietic acid the melting point will usually be between 154° C. and 158° C. for crystals purified by a single recrystallization from absolute alcohol.

The crystalline product is substantially insoluble in acetone. It is somewhat soluble in hot absolute alcohol or hot ethyl acetate and readily recrystallizes from both upon cooling. The crystalline salt fuses to a light yellow liquid with evolution of ammonia. When heated with strong sodium hydroxide solution, acetone is evolved.

The preparation of the new compounds is illustrated by the following examples in which "parts" represent parts by weight unless otherwise indicated.

Example 1

Into 100 parts of an acetone solution containing 20% by weight of FF wood rosin were poured 15 parts of liquid anhydrous ammonia. The mixture was permitted to warm up by its own heat of reaction. A precipitate formed after about ½ hour. The mixture was permitted to stand about 1 additional hour after which the crystalline precipitate was filtered from the mixture, washed with acetone and dried in a vacuum desiccator to yield 10.7 parts of crystalline salt. This salt was nearly white in color, having a faint tinge of yellow. It had a melting point of about 150° C. with decomposition.

Example 2

Example 1 was repeated except that the FF wood rosin was replaced by a hydrogenated wood rosin having a drop melting point of 76° C. and an acid number of 165. A precipitate formed in this case very shortly after adding the ammonia to the acetone-hydrogenated rosin solution. Nine parts of white crystalline salt were recovered.

Example 3

A 20% solution of wood rosin in acetone, similar to the solution utilized in Example 1, was saturated at room temperature by gaseous ammonia bubbled into the solution with agitation thereof. The addition of the ammonia was continued for ½ hour to insure saturation and the presence of an excess of ammonia. The heat of reaction brought the temperature to the boiling point of the mixture. The mixture was then permitted to stand ½ hour and the precipitated crystalline salt which formed therein was recovered by filtering and washing with acetone as in Example 1. The product was the same as that obtained in Example 1.

Example 4

Twenty parts of N wood rosin were dissolved in 120 parts of acetone. Sixteen parts of liquid ammonia were then added. A precipitate formed but redissolved. Upon cooling the mixture to well below 0° C. a copious precipitate formed. Separation of this precipitate showed it to have a vague melting range of about 85° C. to 110° C. This precipitate was discarded and the filtrate was permitted to stand for 24 hours at room temperature. Three parts of the crystalline product obtained in Example 1 were then recovered from the filtrate. Repetition of this procedure but permitting the solution to stand at room temperature (actual temperature in solution rose to 40–50° C.) caused the formation of the desired crystalline diacetoneamine abietate salt in a yield of 10.5 parts. This product in the unpurified state had a melting point of about 150° C.

As shown in the examples, the ammonia may be added in the form of gaseous ammonia or in the form of liquid ammonia. However, it is essential that the ammonia be in excess of the rosin acid present. A large excess may be used, an excess from about 10% to about 300% of the theoretical amount which will react with the acetone and the rosin acid being preferred. The reaction may be conducted at any temperature between about 0° C. and about 100° C. It will be noted that although the ammonia may be added as liquid ammonia at a low temperature the heat of reaction soon brings the temperature into the 0–100° C. range. Sufficient ammonia is retained by an open reaction mixture to provide the necessary excess. If the reaction mixture is held at below about 0° C. little or none of the desired product is obtained but instead there may be formed undesired ammonium abietate. Where the temperature is permitted to rise above about 0° C., any initial precipitate of undesired material will usually redissolve and react further to form the desired product. Preferably the reaction is initiated at room temperature or permitted to rise from the temperature of any liquid ammonia added to room temperature. Ordinarily the resulting temperature will be between about 10° C. and about 56° C.

The new salts may be prepared from abietic acid, pimaric acid, sapinic acid or such acids in hydrogenated form. Usually they will be provided as ordinary rosin or hydrogenated rosin. Heat treated rosin, polymerized rosin and dehydrogenated rosin are likewise suitable. The concentration of the rosin acid will usually be from about 0.03 to about 0.09 mols of rosin acid per mol of acetone or other ketone formed from acetone, used.

It appears that the acetone forms diacetone alcohol in the presence of the excess ammonia and that the diacetone alcohol then reacts with the ammonia with replacement of the hydroxyl group by an amine group to form diacetoneamine. Simultaneously or subsequently this combines with the rosin acid to form the crystalline precipitated salt. It is possible that the diacetone alcohol believed to be formed dehydrates to mesityl oxide which then adds ammonia to form the diacetoneamine. The diacetoneamine rosin acid salt may be prepared in the manner shown by the examples when the acetone is replaced by diacetone alcohol or by mesityl oxide or by mixtures of these substances with acetone.

The reaction of the ammonia with the intermediate acetone condensate occurs most readily under anhydrous or substantially anhydrous conditions. It is, therefore, preferable to start with substantially anhydrous reactants so that the water present in the reaction mixture is little or no more than that formed in the reaction.

The products of this invention find use as accelerators in rubber vulcanization and also as inhibitors, preventing the oxidation of oils, rosin size and other materials which deteriorate readily on oxidation. They also have value as dispersing agents, for example, in dispersing pigments in paint vehicles.

This application is a continuation in part of my copending application, Serial No. 438,899, filed April 14, 1942.

What I claim and desire to protect by Letters Patent is:

1. The diacetoneamine salt of a rosin acid.
2. A diacetoneamine hydroabietate.
3. Diacetoneamine abietate.
4. A process for the preparation of a diacetoneamine rosin acid salt which comprises subjecting a compound selected from the group consisting of acetone, mesityl oxide and diacetone alcohol to treatment with a rosin acid and ammonia in molal excess of the acid, at a temperature between about 0° C. and about 100° C., until a crystalline precipitate of the diacetoneamine salt of the acid used is formed, and recovering the precipitated salt from the reaction mixture.
5. A process for the preparation of a diacetoneamine rosin acid salt which comprises subjecting a compound selected from the group consisting of acetone, mesityl oxide and diacetone alcohol to treatment with abietic acid and ammonia in molal excess of the acid, at a temperature between about 0° C. and about 100° C., until a crystalline precipitate of the diacetoneamine salt of the acid used is formed, and recovering the precipitated salt from the reaction mixture.
6. A process for the preparation of a diacetoneamine rosin acid salt which comprises subjecting a compound selected from the group consisting of acetone, mesityl oxide and diacetone alcohol to treatment with a hydroabietic acid and ammonia in molal excess of the acid, at a temperature between about 0° C. and about 100° C., until a crystalline precipitate of the diacetoneamine salt of the acid used is formed, and recovering the precipitated salt from the reaction mixture.
7. A process for the preparation of a diacetoneamine rosin acid salt which comprises subjecting acetone and abietic acid to treatment with ammonia in molal excess of the acid, at a temperature between about 0° C. and about 100° C., until a crystalline precipitate of the diacetoneamine salt of the acid used is formed, and recovering the precipitated salt from the reaction mixture.
8. A process for the preparation of a diacetoneamine rosin acid salt which comprises subjecting acetone and a hydroabietic acid to treatment with ammonia in molal excess of the acid, at a temperature between about 0° C. and about 100° C., until a crystalline precipitate of the diacetoneamine salt of the acid used is formed, and recovering the precipitated salt from the reaction mixture.
9. A process for the preparation of a diacetoneamine rosin acid salt which comprises subjecting diacetone alcohol and abietic acid to treatment with ammonia in molal excess of the acid, at a temperature between about 0° C. and about 100° C., until a crystalline precipitate of the diacetoneamine salt of the acid used is formed, and recovering the precipitated salt from the reaction mixture.

LUDWIG F. AUDRIETH.